United States Patent [19]

Schibline

[11] 4,289,989

[45] Sep. 15, 1981

[54] BRUSHLESS EXCITER ROTOR MOUNTING

[75] Inventor: Patrick J. Schibline, Merrill, Wis.

[73] Assignee: Marathon Electric Manufacturing Corp., Wausau, Wis.

[21] Appl. No.: 101,480

[22] Filed: Dec. 10, 1979

[51] Int. Cl.³ ............................................. H02K 1/22
[52] U.S. Cl. .................. 310/261; 310/68 D; 310/165; 310/217
[58] Field of Search ................. 310/165, 68 R, 68 D, 310/42, 113, 112, 114, 216, 217, 261, 264, 265; 336/210, 211, 217, 234

[56] References Cited

U.S. PATENT DOCUMENTS

| | | | |
|---|---|---|---|
| 1,805,935 | 5/1931 | Weathers | 310/113 |
| 3,034,035 | 5/1962 | Baumann | 310/68 D |
| 3,650,022 | 3/1972 | Stone | 310/217 |
| 3,749,949 | 7/1973 | Müller | 310/114 |

*Primary Examiner*—R. Skudy
*Attorney, Agent, or Firm*—Andrus, Sceales, Starke & Sawall

[57] ABSTRACT

A brushless exciter rotor mounting of a sleeveless design directed to a rotor core which is mounted on the shaft of an AC generator so that the rotor core can be rotated by the generator to provide direct current to the generator. The shaft has a stepped construction providing a larger diameter of the shaft at the inner end portion and a lesser diameter portion of the shaft extending outwardly therefrom. The rotor core has a slightly larger inner diameter than the lesser diameter portion of the shaft for a predetermined length to provide a radial clearance therebetween. At the inner end of the shaft the rotor core pilots to the larger diameter end portion of the shaft and at the outer end portion of the shaft a standoff casting pilots to the shaft. The shaft is keyed to the rotor core to prevent rotation of the shaft within the rotor core. Capscrews secure the rotor core to the standoff casting at the outer end of the assembly and the standoff casting is in turn secured to the shaft through a capscrew and belleville washer which seats the shaft within the standoff casting.

8 Claims, 5 Drawing Figures

BRUSHLESS EXCITER ROTOR MOUNTING

BACKGROUND OF THE INVENTION

The invention is directed to a sleeveless exciter rotor mounting for brushless generators. By not using a mounting sleeve a costly part of the exciter rotor mounting is eliminated. In addition a central clearance is provided between the shaft and rotor core by a step in the diameter of the shaft which provides for piloting the shaft in operating position for easy assembly and disassembly.

SUMMARY OF THE INVENTION

In general, the exciter rotor pilots on the generator shaft at one end and within a standoff casting at the other end with radial clearance between the rotor bore and the shaft diameter in substantially the middle of the rotor core length. The clearance is provided by an enlarged diameter step in the shaft at the inner end of the shaft. The rotor core and standoff casting to shaft pilots are of a predetermined length such as of the order of 0.25 inches long at both end portions of the shaft to provide the centering of the shaft. This results in easy assembly and disassembly of the rotor core to the shaft except for the last 0.25 inches of assembly and the first 0.25 inches of the disassembly. A capscrew when inserted through the standoff casting and threaded into the shaft pulls the exciter rotor onto the shaft.

The standoff casting has an internal stepped construction which pilots it to the shaft by aligning on the outside diameter of the shaft and seating against the end faced shaft. The exciter rotor mounting capscrew clamps the standoff casting to the end of the shaft with a belleville washer which is employed to maintain the capscrew preload. The capscrew has metal to metal contact to maintain the fastener preload. A clamping plate located opposite the standoff casting keeps the laminated stack of the rotor core tight by capscrews which extend through the clamping plate and laminations and are threaded into the standoff casting.

A rectifier bridge assembly is secured to bosses which are provided as part of the standoff casting and is electrically connected to the generator to carry the current developed by the exciter to the generator.

DESCRIPTION OF THE PREFERRED EMBODIMENT

Figure 1:
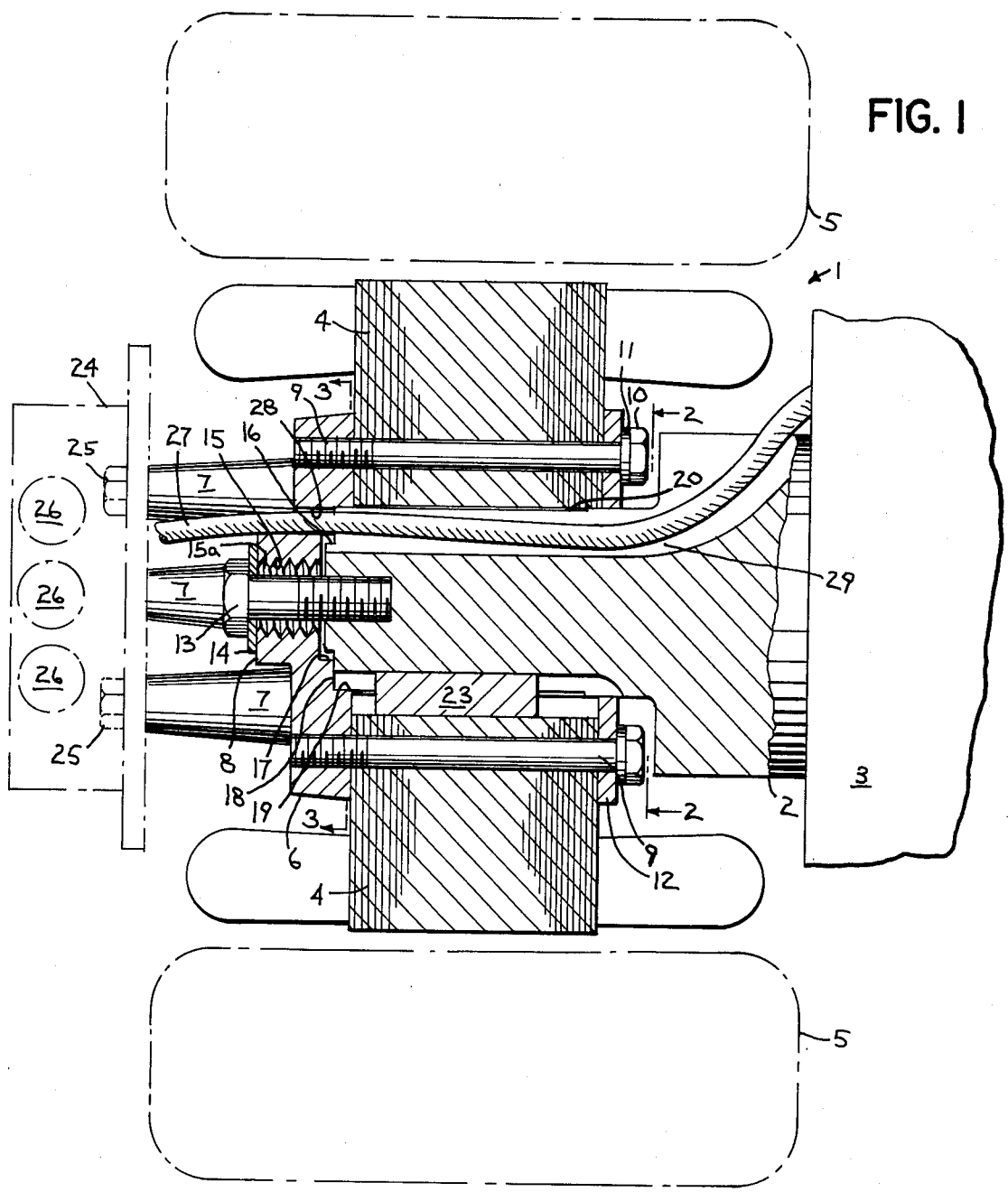
FIG. 1 is a side elevational view with parts in section.
Figure 5:
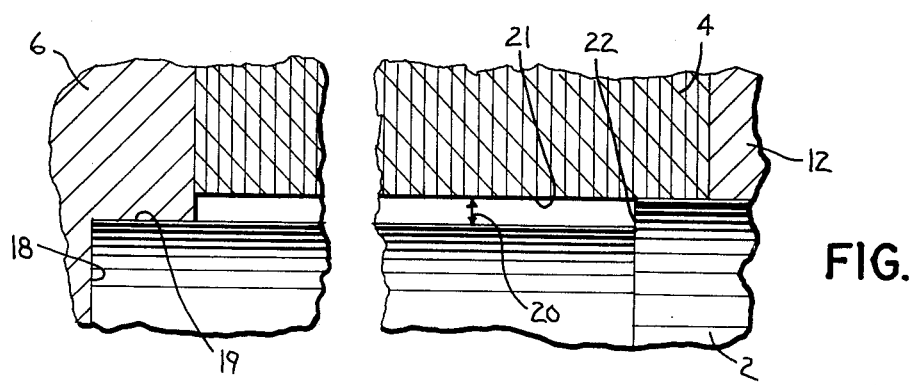
FIG. 5 is a detail view of the shaft illustrating the enlarged diameter of the shaft.
Figure 2:
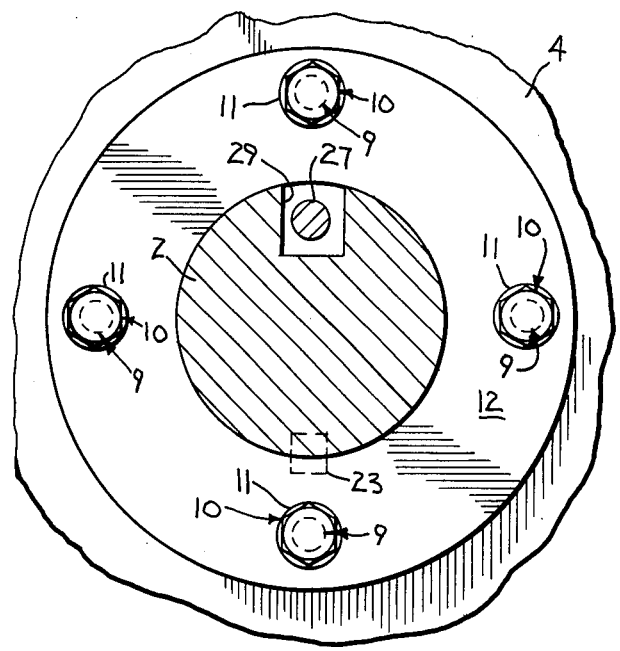
FIG. 2 is a sectional view taken on line 2—2 of FIG. 1.
Figure 3:
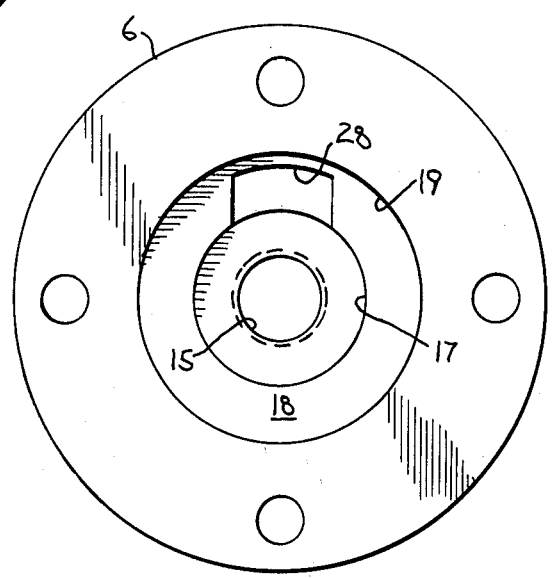
FIG. 3 is a section taken on line 3—3 of FIG. 1 showing only the standoff casting.
Figure 4:
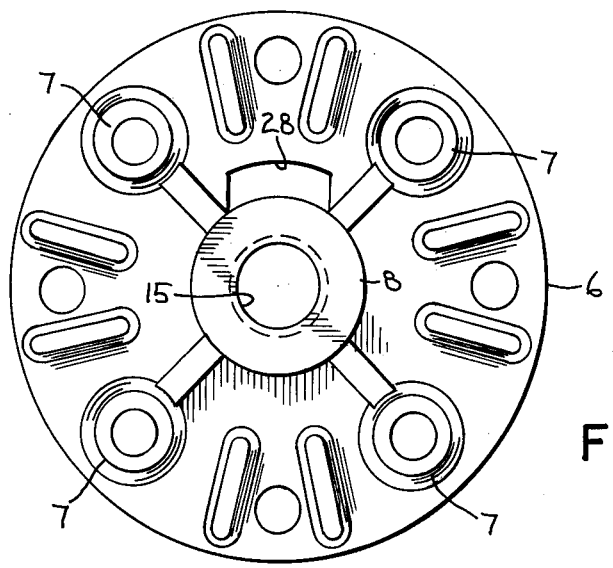
FIG. 4 is a view looking at the outer side of the standoff casting.

Referring to the drawings there is shown in Fig. 1 a brushless exciter rotor core 1 which is assembled on shaft 2 of the generator 3 shown in phantom.

The exciter rotor core 1 and laminations 4 and is assembled within stator 5 shown in phantom and around shaft 2 of generator 3. A standoff casting 6 having a plurality of circumferentially spaced bosses 7 and a central boss 8 is secured to the outer end of rotor core 1 at the free end of shaft 2 by a plurality of circumferentially spaced capscrews 9 which extend from the inner end of rotor core 1 through the laminations 4 and are threaded into standoff casting 6. The head 10 of each capscrew overlies a lock washer 11 and the clamping plate 12. The capscrews 9 and plate 12 also clamp laminations 4 tightly in place as well as securing the standoff casting 6 to rotor core 1.

The exciter rotor core 1 is secured to generator shaft 2 by a single capscrew 13 which overlies the metal belleville washer 14 and is threaded into the outer end of the shaft 2. The washer 14 is of the spring type to maintain the capscrew fastener 13 preload. The preload is thus not dependent on the stacked rotor laminations 4 which could relax and provide a loss of preload.

The internal constructions of boss 8 provides for a hole 15 slightly larger than the diameter of the capscrew 13 so that capscrew 13 has clearance to be threaded directly into the shaft 2 which is provided at the outer end with an abutment 16. Boss 8 has threads 15a around hole 15 to receive an extractor capscrew (not shown) which when threaded into threads 15a around hole 15, pushes against abutment 16 forcing the rotor core 1 off the shaft 2. The inside of standoff casting 6 has an inner step 17 which overlies abutment 16 and an inner face 18 terminating in the inner step 19 which surrounds shaft 2.

The clearance 20 is provided between the bore 21 of rotor core 1 and shaft 2 substantially in the middle of the rotor length. Clearance 20 is provided by the greater diameter or step enlargement 22 in the generator shaft 2 adjacent the generator 3 and which provides a lesser diameter in shaft 2 extending outwardly from step 22 for clearance 20. The rotor core 1 pilots to shaft 2 on the enlargement or step 22 in the shaft 2 on one end, and on step 19 on the other end within standoff casting 6. The pilots may be various predetermined lengths. Satisfactory centering results of rotor core 1 have been obtained when step or enlargement 22 of shaft 2 and inner step 19 of standoff casting 6 are each of the order of 0.25 inches in length. This provides easy assembly and disassembly of rotor core 1 to shaft 2 except for the last 0.25 inches of assembly and the first 0.25 inches of disassembly. The mounting capscrew 13 pulls the rotor core 1 onto shaft 2 and into a recess in the standoff casting 6 provided by face 18 and step 19 when capscrew 13 is threaded into shaft 2.

Shaft 2 is prevented from rotating inside of exciter rotor core 1 by a key 23 which keys the shaft to rotor core 1.

On the lefthand side of FIG. 1 the rectifier bridge assembly 24 which is secured by capscrews 25 to bosses 7 of the standoff casting 6 is shown in phantom. The bridge assembly 24 has six diodes of which only three diodes 26 are illustrated. Wires 27 extend from the bridge assembly 24 through a passage 28 provided in standoff casting 6, thence through the passage 29 in shaft 2 and to the AC generator 3 shown diagrammatically in FIG. 1.

Because an AC generator requires direct current flowing through the rotor windings of the generator to set up the magnetic flux which allows the unit to generate, the output from the generally small exciter rotor or miniature generator is fed into the rectifier bridge assembly 24 which then supplies direct current through wires 27 to the AC generator 3. Because as is well known, the AC exciter requires direct current for its excitation, this excitation is supplied by rectifying a portion of the output of the generator 3 by means of a static voltage regulator, not shown.

The invention provides a brushless and sleeveless exciter which decreases costs and also provides an easy way to assemble and disassemble the eciter with respect to the shaft of the generator.

Various modes of carrying out the invention are contemplated as being within the scope of the following claims particularly pointing out and distinctly claiming the subject matter which is regarded as the invention.

I claim:

1. The mounting of a brushless exciter rotor to a generator by a sleeveless construction, comprising a shaft extending from the generator and having a stepped construction of predetermined lengths providing a larger diameter in the shaft at the inner end portion and a lesser diameter portion in the shaft extending outwardly from the inner end portion, a rotor core with an inner diameter slightly larger than the lesser diameter portion of the shaft, an outer end member assembled to the outer end of the rotor core and having an inner diameter substantially in line with the lesser diameter portion of the shaft and disposed in a predetermined length of engagement with the shaft lesser diameter portion, an end member assembled to the inner end of the rotor core with the inside of the last named end member in a predetermined length of engagement with the larger diameter inner end portion of the shaft, the stepped construction of the shaft providing a radial clearance around the shaft between the rotor core and lesser diameter portion of the shaft for a predetermined length of the rotor core, means to pull the rotor core to seating position with respect to the shaft and secure the rotor core to the shaft, means to secure the rotor core to the shaft to prevent rotation of the shaft within the rotor core, and means to secure the rotor core to the end members.

2. The brushless exciter mounting of claim 1, and laminations provided as part of the rotor core, and the means to secure the rotor core to the end members being a plurality of circumferentially spaced capscrews extending through the laminations and one of the end members and threaded into the other end member to tightly secure the laminations in place and to the end members.

3. The brushless exciter mounting of claim 1, and laminations provided as part of the rotor core and being the inner end member and having an inner diameter corresponding to the large diameter inner end portion of the shaft and disposed in a predetermined length of engagement with the inner end portion of the shaft.

4. The brushless exciter mounting of claim 1, and the outer end member being a standoff casting having a central boss and a central opening, and the means connecting the outer end member to the shaft being a capscrew extending through the central opening in the boss and threaded into the shaft to effect the pulling of the shaft into seating position, and a spring-like washer located between the cap of the screw and the boss to preload the fastening of the standoff casting to the shaft.

5. The standoff casting of claim 4, and the central opening being a threaded hole allowing an extractor capscrew to be used for rotor core removal from the shaft.

6. The standoff casting of claim 4 having a plurality of circumferentially spaced outwardly extending bosses, a rectifier bridge assembly assembled to the standoff casting, and capscrews extending from the rectifier bridge assembly and threaded into the bosses of the standoff casting to secure the rectifier bridge assembly to the standoff casting.

7. The standoff casting of claim 6, and passages extending through the standoff casting and shaft, and wires extending through the passages from the rectifier bridge assembly to the generator to carry direct current to the generator.

8. The brushless exciter mounting of claim 1, and the stepped construction of the end members and the lesser and larger diameter of the shaft being of an engagement length of the order of 0.25 inches to facilitate easy assembly and disassembly of the mounting.

* * * * *

UNITED STATES PATENT AND TRADEMARK OFFICE
CERTIFICATE OF CORRECTION

PATENT NO. : 4,289,989
DATED : September 15, 1981
INVENTOR(S) : Patrick John Schibline It is certified that error appears in the above-identified patent and that said Letters Patent are hereby corrected as shown below:

Column 2, Line 21, Cancel "toreceive" and substitute therefor ---to receive---;

Column 3, Line 5, Cancel "eciter" and substitute therefor ---exciter---.

Signed and Sealed this

Eighth Day of December 1981

[SEAL]

Attest:

GERALD J. MOSSINGHOFF

Attesting Officer    Commissioner of Patents and Trademarks

UNITED STATES PATENT AND TRADEMARK OFFICE
CERTIFICATE OF CORRECTION

PATENT NO. : 4,289,989
DATED : September 15, 1981
INVENTOR(S) : Patrick J. Schibline It is certified that error appears in the above-identified patent and that said Letters Patent are hereby corrected as shown below:

Column 4, Line 20, CLAIM 5

After "The" cancel "standoff casting" and substitute therefore --- exciter ---;

Column 4, Line 24, CLAIM 6

After "The" cancel "standoff casting" and substitute therefore --- exciter ---; and after "4" insert --- , and said standoff casting ---;

Column 4, Line 31, CLAIM 7

After "The" cancel "standoff casting" and substitute therefore --- exciter ---.

Signed and Sealed this

Twentieth Day of July 1982

[SEAL]

Attest:

GERALD J. MOSSINGHOFF

Attesting Officer

Commissioner of Patents and Trademarks